(12) United States Patent
Burgeson

(10) Patent No.: US 8,510,984 B2
(45) Date of Patent: Aug. 20, 2013

(54) TEMPERATURE REGULATED, PRESSURE ACTIVATED SCENT DISPENSER AND METHOD OF USING THEREOF

(75) Inventor: Samuel A. Burgeson, Blaine, MN (US)

(73) Assignee: Wildlife Research Center, Inc., Ramsey, MN (US)

( * ) Notice: Subject to any disclaimer, the term of this patent is extended or adjusted under 35 U.S.C. 154(b) by 567 days.

(21) Appl. No.: 11/831,773

(22) Filed: Jul. 31, 2007

(65) Prior Publication Data

US 2009/0031608 A1 Feb. 5, 2009

(51) Int. Cl.
*A01M 31/00* (2006.01)
(52) U.S. Cl.
USPC .................................. 43/1; 222/54; 222/181.1
(58) Field of Classification Search
USPC ................... 43/1; 222/54, 181.1, 181.2, 529; 119/711
See application file for complete search history.

(56) References Cited

U.S. PATENT DOCUMENTS

| | | | | |
|---|---|---|---|---|
| 4,773,177 | A * | 9/1988 | Gray et al. | 43/1 |
| 4,993,568 | A * | 2/1991 | Morifuji et al. | 215/11.1 |
| 5,035,340 | A * | 7/1991 | Timmons | 215/11.4 |
| 5,060,411 | A * | 10/1991 | Uhlman | 43/1 |
| 5,148,949 | A | 9/1992 | Luca | |
| 5,220,741 | A | 6/1993 | Burgeson | |
| 5,279,062 | A | 1/1994 | Burgeson | |
| 5,361,527 | A | 11/1994 | Burgeson | |
| 5,429,271 | A | 7/1995 | Porter | |
| 5,461,814 | A | 10/1995 | Reid et al. | |
| 5,555,663 | A * | 9/1996 | Burgeson | 43/1 |
| 5,971,208 | A * | 10/1999 | Kennedy | 222/54 |
| 6,209,252 | B1 | 4/2001 | McGough | |
| 6,592,104 | B2 | 7/2003 | Cox | |
| 7,108,199 | B1 | 9/2006 | Brown | |
| 2008/0054021 | A1* | 3/2008 | Brown et al. | 222/175 |
| 2008/0283537 | A1* | 11/2008 | Smith et al. | 220/713 |

OTHER PUBLICATIONS

Tricorbraun plastic bottle, RapidCode 2016531 (details retrieved from http://rapidfind.tricorbraun.com/products/productDetails.asp?matl=plastic&resultsetID=13455&productID+3230841 &startindex=1 on Oct. 8, 2010).
Tricorbraun plastic bottle, RapidCode 3002611 (details retrieved from http://rapidfind.tricorbraun.com/products/productDetails.asp?matl=closures&resultsetID=13460&productID=9989 &startindex=61 on Oct. 8, 2010).

* cited by examiner

*Primary Examiner* — Christopher P Ellis
(74) *Attorney, Agent, or Firm* — Dorsey & Whitney LLP

(57) ABSTRACT

The present disclosure relates to a temperature regulated, pressure activated liquid scent dispenser. The pressure in the interior of the container may increase as ambient temperature increases. A release structure of the container may release a portion of the liquid scent once a threshold pressure or threshold amount of pressure build-up is reached in the interior of the container. A method comprises filling the interior volume with a liquid scent so that the interior volume also includes a volume of air, suspending the dispenser over a ground surface, and dispensing the liquid scent from the interior volume through the release structure. Due to an increase of pressure of the volume of air, and upon reaching a threshold air pressure, the release structure releases a portion of the liquid scent from the interior volume. Applications may include dispensing animal attractant or repellent.

17 Claims, 8 Drawing Sheets

TEMPERATURE REGULATED, PRESSURE ACTIVATED SCENT DISPENSER AND METHOD OF USING THEREOF

FIELD OF THE INVENTION

The present disclosure includes apparatuses and methods for a liquid scent dispenser. More particularly, the present disclosure relates to apparatuses and methods for a temperature regulated, pressure activated liquid scent dispenser, wherein a release structure of the dispenser may release a portion of a liquid scent once a threshold pressure is reached in the interior of the dispenser.

BACKGROUND OF THE INVENTION

The use of animal attractant scents by hunters to increase their chances of hunting success is well known. In particular, these scents can be used in ways that take advantage of the mating processes of certain species. For example, in the case of white-tail deer, it is known that the buck will prepare a "scrape" to attract a doe. The scrape is prepared by the buck as he scrapes the ground with his hooves at a particular spot and deposits some urine thereon. This action can serve to attract a doe, who may then periodically deposit scent, including urine, on the scrape, which may at times indicate her receptiveness for mating. In addition, other bucks also may visit the scrape, for territorial or other reasons. The buck will, in this manner, be alerted to the presence of the doe and/or other bucks and will tend to spend more time in the location of his scrape. This increase in time spent in a particular area makes him easier to hunt. Thus, hunters will prepare an artificial, or mock, scrape or locate a natural scrape, in attempts to attract a deer. This is done by finding a scrape, or preparing a mock scrape by scraping the ground in a manner similar to that of a buck, and then depositing a commercially available scent thereon, which may signal to the buck the presence of a doe in the correct stage of her estrous cycle. Mock scrapes are commonly prepared by hunters to imitate natural scrapes and achieve the same purpose.

Examples of commercially available scents, that may be sold with or without a device for dispensing the scents, may include but are not limited to, doe urine, doe estrous secretions, and buck urine. The commercially available scents may also be artificial, man-made, or made with other natural ingredients.

Devices for depositing such scents are known, and generally consist of a bottle or other container for holding the scent and a valve for regulating the rate that the scent drips therefrom onto the scrape. Such devices are typically suspended from a branch above the scrape and provide for a continuous release of the scent. However, such a continuous flow is not generally desirable and may be disadvantageous, as attractant scents are relatively expensive, and release is not necessary during the night or during periods of rain when the scent can be washed away. Generally, it may be better to dispense a scent only during the daytime hours. This may make it likely the animal will visit the location of the dispenser during daytime hours. In some cases, such as during rut, bucks may visit locations both during the night and day hours. A dispenser that conditions the buck to come around during the daytime hours may help change the buck's pattern. Continual manual opening and closing of the valve, as would be done with the prior art devices, is not a good solution to this problem as scent deposition can take place over a number of days and would therefore be tedious. Similarly, continual opening and closing of the valve is not desirable due to the greater possibility of leaving unwanted human odors around the scrape. Also, the valves of these devices, when set to provide for a very low flow rate, can become blocked and completely stop the flow of scent.

Yet other scent dispensing devices, such as those described in U.S. Pat. Nos. 5,220,741, 5,279,062, and 5,361,527, take advantage of the relative change in temperature that generally occurs between day and night. A liquid scent, in one embodiment, fills a reservoir. As temperature increases to a great enough level, the volume of liquid scent in the reservoir rises high enough to reach an opening at the top of the reservoir, where the liquid scent drips from the dispensing device. In another described embodiment, the reservoir is a tube formed into a loop whereby it extends through an arc of 360 degrees. As such, the temperature must increase to a level wherein the liquid scent will be forced through the arc and drip out an opening at the end of the reservoir tube.

There is a need in the art for apparatuses and methods for a liquid scent dispenser which overcomes the deficiencies and limitations of the prior art. Particularly, there is a need in the art for apparatuses and methods for a temperature regulated, pressure activated scent dispenser that may release a portion of a liquid scent once a threshold pressure is reached in the interior or the dispenser due to a change in temperature of the air within the dispenser that is more efficient and does not include the limitations of the prior art. There is a further need in the art for apparatuses and methods for a temperature regulated, pressure activated scent dispenser that may release a portion of a liquid scent after a threshold build-up of pressure is reached in the interior or the dispenser due to a change in temperature of the air within the dispenser.

BRIEF SUMMARY OF THE INVENTION

The present invention, in one embodiment, is a method of dispensing a liquid scent using a temperature regulated, pressure activated scent dispenser. The dispenser comprises a container defining an interior volume and a container opening. The dispenser further includes a cap and a scent release orifice, which has a release structure. The method comprises filling the container interior volume partially with a volume of the liquid scent so that the container interior volume also includes a volume of air, securing the cap to the container opening, suspending the scent dispenser over a ground surface of a desired animal attracting location, and dispensing the liquid scent from the interior volume through the scent release orifice. An increase in ambient temperature above an initial ambient temperature results in an increase in air pressure in the interior volume, and upon reaching a threshold air pressure or threshold amount of pressure build-up, the release structure releases a portion of the liquid scent from the interior volume, thereby generally equalizing the air pressure in the interior volume with the air pressure outside of the dispenser.

The present invention, in another embodiment, is a method of dispensing a liquid scent using a container including an interior volume having a volume of liquid scent and a volume of air. The dispenser further comprises a scent release orifice including a release structure diaphragm. The method comprises suspending the scent dispenser over a ground surface of a desired animal attracting location, and dispensing the liquid scent from the interior volume through the scent release orifice. An increase in ambient temperature above an initial ambient temperature results in an increase in air pressure in the interior volume, and upon reaching a threshold air pressure or threshold amount of pressure build-up, the release structure releases a portion of the liquid scent from the interior volume. Furthermore, upon release of the portion of liquid scent, the air pressure within the interior volume is decreased.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present invention, it is believed that the invention will be better understood from the following description taken in conjunction with the accompanying Figures, in which:

DETAILED DESCRIPTION

The present disclosure includes novel and advantageous apparatuses and methods for a liquid scent dispenser. More particularly, the present disclosure relates to apparatuses and methods for a temperature regulated, pressure activated liquid scent dispenser. The pressure in the interior of the container may increase as ambient temperature increases. A release structure of the container may release a portion of the liquid scent once a threshold pressure or threshold amount of pressure build-up is reached in the interior of the container. Applications of such devices may include, but are not limited to, dispensing animal attractant or repellent in the form of a liquid scent, and in some embodiments, dispensing animal attractant over an artificial or natural scrape. A liquid scent dispenser of the present disclosure may be well suited for use at both natural and mock scrapes. Some examples of scents may include, but are not limited to, doe urine, doe estrous secretions, and buck urine. The scents may be artificial or man-made. Similarly, the scents may be used during any period of time that is suitable and is not limited to mating season or hunting season or any specific animal.

Figure 1:
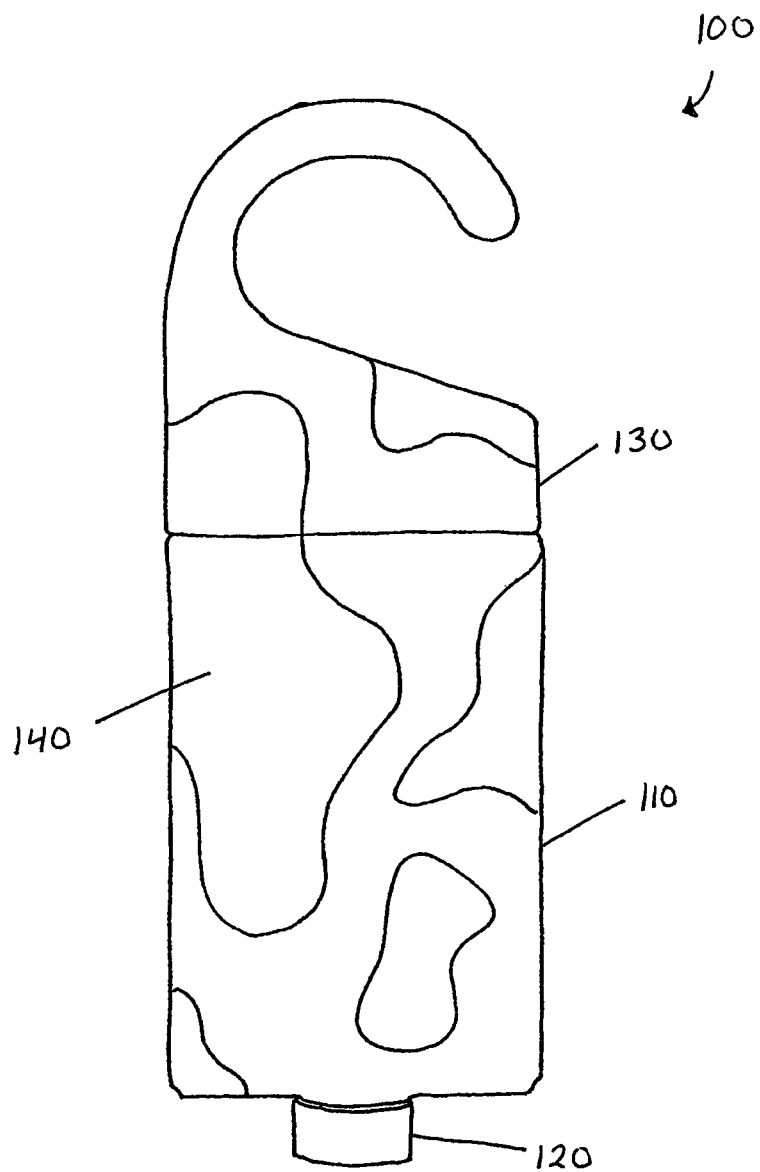
FIG. 1 is a front view of a liquid scent dispenser in accordance with one embodiment of the present disclosure.

With reference to FIG. 1, one embodiment of a liquid scent dispenser is generally illustrated as 100. The liquid scent dispenser 100 may include a container 110 for holding a liquid. As described in further detail below, the liquid scent dispenser 100 may further include a cap 120 and a cover component 130. As will be described further, it is recognized that not all components listed above are required for the liquid scent dispenser 100, and some of the components may be eliminated while other components may be added.

In further embodiments, the liquid scent dispenser 100 may have a surrounding design, such as but not limited to a camouflage design 140. In alternative embodiments the dispenser may be clear, colored, patterned with a design, include a label, wrapped in a cloth or other fabric or material having a color, pattern, or design, etc., or any combination thereof. The design may be selected such that the liquid scent dispenser 100 is hidden or blends with the surrounding environment. In other embodiments, the design of the liquid scent dispenser 100 may be brightly colored, for example blaze orange. In such case, the liquid scent dispenser 100 may be very visible to humans and may be used as a trail marker, yardage marker, etc. In a further embodiment, a clear strip may be located on the liquid scent dispenser 100 such that the level of liquid in the liquid scent dispenser 100 may be indicated.

Figure 2:
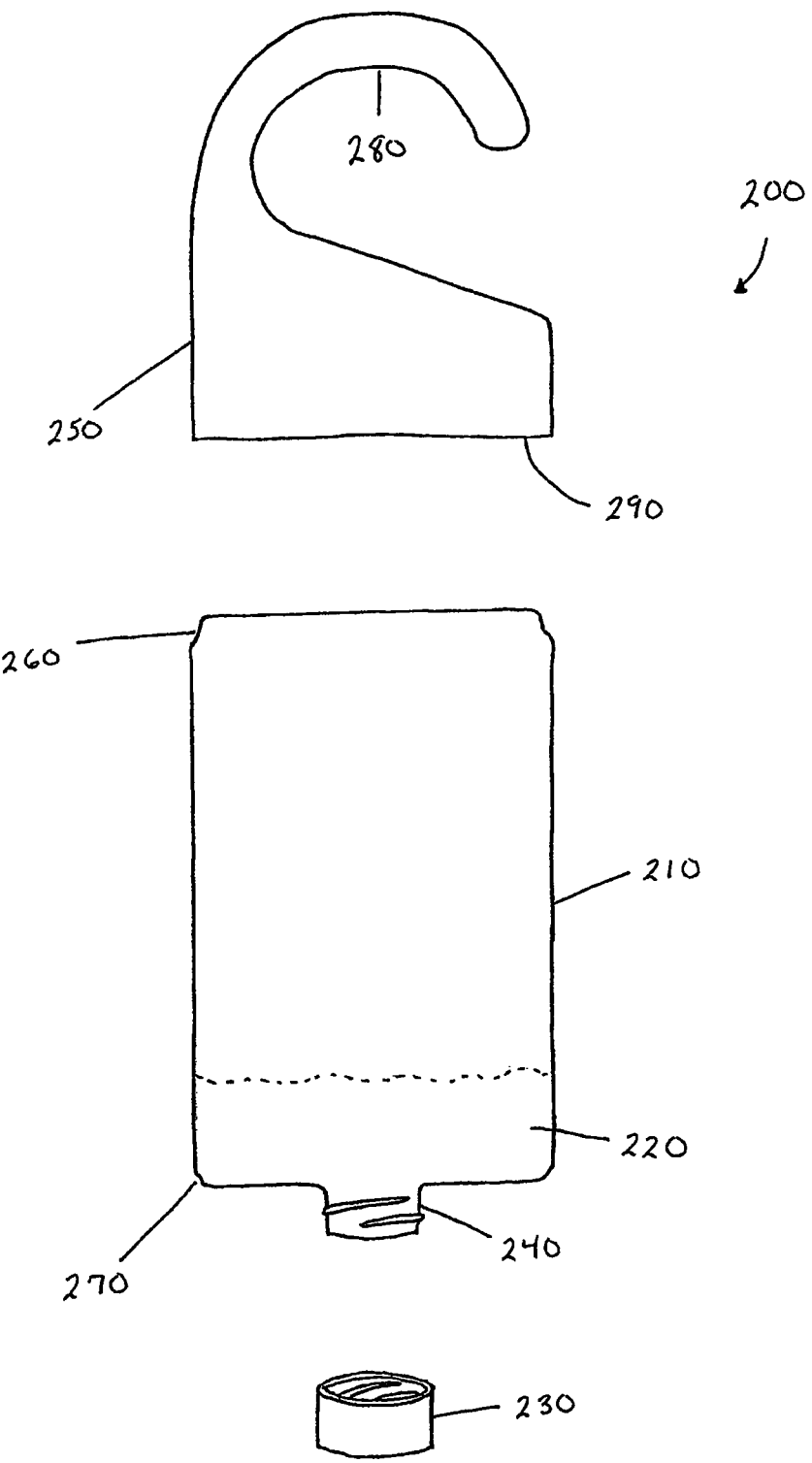
FIG. 2 is an unassembled, front view of a liquid scent dispenser in accordance with another embodiment of the present disclosure.

FIG. 2 illustrates an embodiment of a liquid scent dispenser 200 in an unassembled view. The liquid scent dispenser 200 may include a container 210 for holding a liquid 220. The container 210 may be made of a generally rigid material, such that pressure may build up in the container 210 without flexing the container 210 too extensively. In some embodiments, the container 210 may be manufactured from plastic, metal or metal alloy, composite, glass, etc., or any combination thereof. In further embodiments, the container material may be durable and inexpensive, such as embodiments made of plastic. In yet further embodiments, the container material may be selected such that the material chosen does not interfere with properties of a liquid contained therein, such as the scent of the liquid. Alternatively, the container's stiffness may range from rigid, to flexible, as appropriate for a given application.

The container 210 may hold a liquid 220, such as a liquid scent. In one embodiment, the liquid 220 may be an animal attractant, including but not limited to an animal sexual attractant. For example, an animal sexual attractant used may include deer urine or a particular scent, produced by a doe when in heat. In alternative embodiments, other liquids may be used, such as but not limited to, animal and/or pest repellents, animal poisons, or scents that provide agreeable or disagreeable odors to humans, masking scents, or any other desired material. In yet further embodiments, the contents of the container may include gels or thick liquids. The liquid 220 may be synthetic, natural, a synthetically produced natural substance, a mixture of these, etc.

The liquid scent dispenser 200 may include an initial amount of liquid 220. In other embodiments, the liquid scent dispenser 200 may be fillable/refillable with a liquid 220. The container 210 may comprise an opening 240. The opening 240 may be used to fill and/or refill the container 210 with a liquid 220. The liquid scent dispenser 200 may also include a cap 230 for sealing the opening 240. The cap 230 may be nonremovable, such as for use with a "one-time-use" liquid scent dispenser 200. In other embodiments, the cap 230 may be removable, so that the liquid scent dispenser 200 may be reusable. The opening 240 and cap 230 may include threads and be threadably engageable with one another. Although threads are illustrated on the outer surface of the opening 240 in FIG. 2, it is recognized that the threads may be on the inner surface of the opening 240. Similarly, the cap 230 may be engageable with the opening 240 in any manner other than or in addition to threads, including but not limited to, snap fit, friction fit, etc.

In a further embodiment, the container 210 may comprise an inner liner that is filled with the liquid 220 and separates the liquid 220 from the inner walls of the container 210. As the liquid 220 is dispensed from the container 210, the inner liner may shrink down with the volume of liquid 220, similar in manner to those liners in certain baby bottles or the like. The liners may further be removable from the container and/or replaceable. In some embodiments, the liners may be provided with a suitable supply of liquid. In such an embodiment, the liners may be sold as refills for the liquid scent dispenser 200.

The container may further include a cover component 250. In one embodiment, the cover component 250 may be engageable with one end 260 of the container 210 through rim 290, as illustrated in FIGS. 1 and 2. In a further embodiment, the cover component 250 may be engageable with more than one end of the container 210, such as the top 270 and bottom 260 ends. The cover component 250 may be engageable with the ends 260, 270 using any means, including but not limited to threading, snap fit, friction fit, etc. In an embodiment shown in FIGS. 1 and 2, the cover component 250 is illustrated as snap fit or a combination of snap fit and friction fit. The cover component 250 may be manufactured from the same material as the container 210. In alternative embodiments, the cover component 250 may be manufactured from a different material than the container 210.

The cover component 250 may further include hanging means 280 for suspending the liquid scent dispenser 200. The hanging means 280 may be a hook, as shown in FIGS. 1 and 2. In other embodiments, the hanging means 280 may include a closed loop, a string, rope, or wire attached to the cover component 250, a clip, a spike or stake, a snap, a screw or any other means for attachment, tape, etc. In yet further embodiments, the hanging means 280 may be an integrated component of the container 210 rather than an element of a cover component 250.

Figure 3:
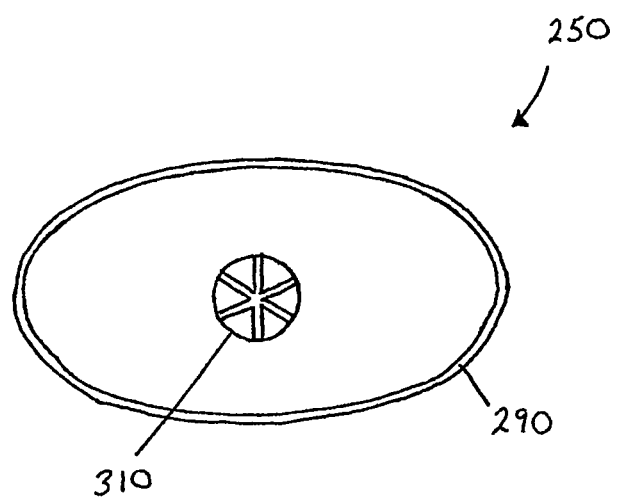
FIG. 3 is a bottom view of a cover component of the liquid scent dispenser of FIG. 2 in accordance with another embodiment of the present disclosure.

A bottom view of one embodiment of a cover component 250 is illustrated in FIG. 3. The cover component 250 may include a stopper 310. The stopper 310 may be used for sealing a scent release orifice, described in further detail below. For example, the cover component 250 and stopper 310 may be used to seal a scent release orifice for leak free packaging, distribution, storage, etc. In one embodiment, the stopper 310 prevents a release structure of the scent release orifice from expelling the liquid 220 from the container 210. Generally, the scent release orifice may be positioned within the cap 230, such that when the cover component 250 engages the top end 270 of the container 210, the stopper 310 abuts, or nearly abuts, the release structure of the scent release orifice. The stopper 310 may be made of any material, including but not limited to plastic, rubber, metal or metal alloy, glass, etc. In one embodiment, the stopper 310 may be made of the same material as the cover component 250. The stopper 310 may be any suitable size and shape to prevent the release structure from allowing liquid to pass, and the embodiment shown in FIG. 3 is for illustration purposes and is not limiting.

Figure 4:
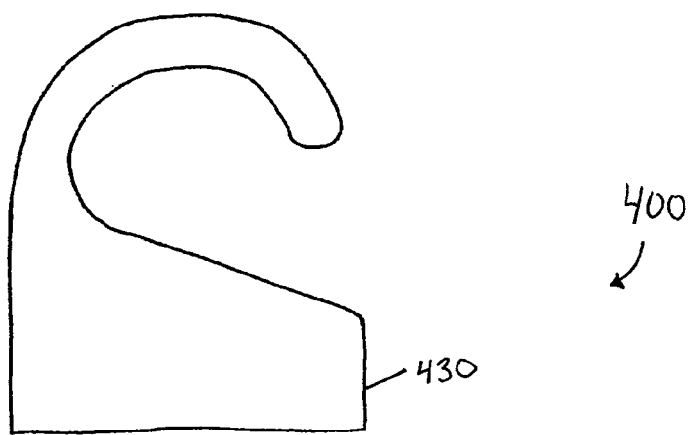
FIG. 4 is an unassembled, front view of a liquid scent dispenser in accordance with a further embodiment of the present disclosure.
Figure 4:
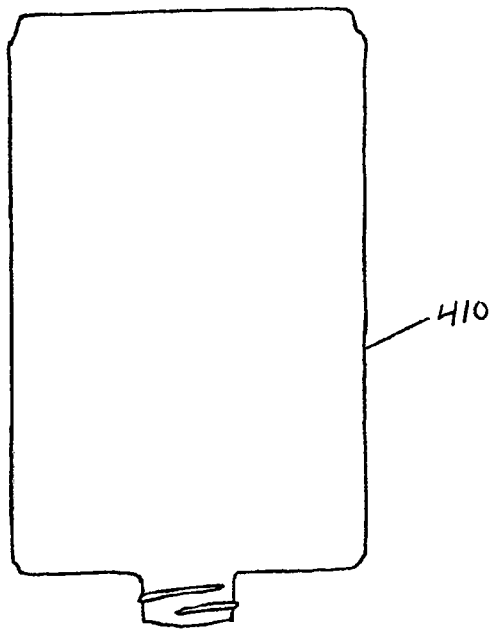
Figure 4:
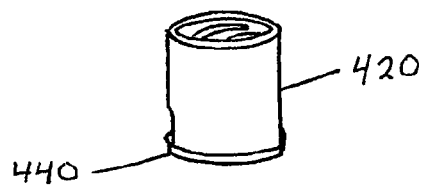

Another embodiment of a liquid scent dispenser 400 is illustrated in FIG. 4. The liquid scent dispenser 400 may have a container 410 for holding a liquid, a cap 420, and a cover component 430. As previously described, it is recognized that not all components listed above are required for the liquid scent dispenser 400, and some of the components may be eliminated while other components may be added. Similarly, for example, the cap 420 and/or cover component 430 may be integrated components of the container 410. The container 410 and the cover component 430 may be similar to that as previously described with reference to FIGS. 1-3. In one embodiment, the cap 420 may include closing means. In the embodiment illustrated in FIGS. 4 and 5, the closing means comprises a lid 440 that has an open and closed position. When the lid 440 is in an open position, the liquid scent dispenser 400 may dispense liquid from the container 410. Generally, as will be further described in detail, the liquid scent dispenser 400 allows liquid to be dispensed through a scent release orifice, e.g., 450. The lid 440 may further comprise a stopper 460 similar to that as previously described with respect to a cover component 250 illustrated in FIG. 3. In such an embodiment wherein the cap 420 comprises a lid 440, the cover component 430 may not include a stopper, as the cap 420 may already include closing means for preventing a liquid in the container 410 from being dispensed.

The closing means of a cap 420 need not be a lid 440, and it is recognized that other embodiments of closing means may be used rather than a lid 440. For example, the cap 420 may include, but is not limited to, closing means comprising a pop-up nozzle, a twist top or nozzle, a slide cover, etc.

Figure 5:
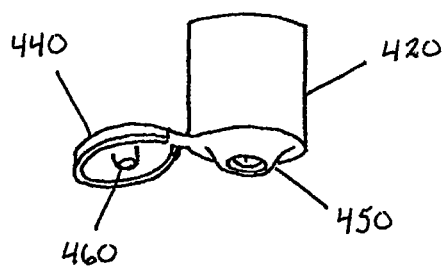
FIG. 5 is a side, perspective view of a cap of the liquid scent dispenser of FIG. 4 in accordance with a further embodiment of the present disclosure.
Figure 6A:
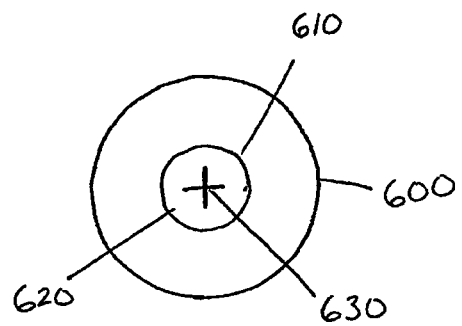
FIG. 6A is a top view of a release structure having a cross slit in a normal, closed position in accordance with an embodiment of the present disclosure.

The container 110, 210, 410 (generally referenced hereinafter as 110) may further include a scent release orifice 450, 610, as illustrated in FIGS. 5 and 6A. In one embodiment, as illustrated in FIGS. 6A-7D, the scent release orifice 610 may be a component of a cap 600, such as that previously described with reference to FIGS. 1-5. In other embodiments, the scent release orifice 610 may be integrated or preformed as a part of the container 110. Furthermore, the scent release orifice 610 may be separate from an opening, e.g., opening 240, in the container 110. In such an embodiment, the container 110 may be filled and/or refilled at a separate location of the container 110 than where the liquid may be dispensed. It is further recognized that multiple openings 240, caps 600, and scent release orifices 610 may be included in a single container 110. It is also recognized that the liquid scent dispenser 100, 200, 400 may be manufactured as a one-piece apparatus rather than a combination of separate components and/or the liquid scent dispenser 100, 200, 400 may be a "one-time-use" dispenser.

The scent release orifice 610 may comprise a release structure 620 from which liquid from the container 110 may be released. Generally, as an ambient temperature increases, the pressure of a volume of air present in the container 110 may increase. Thus, the air pressure may build within the container 110 causing a force to be applied against the release structure 620. Typically, as will be described in detail below, the liquid scent dispenser may be oriented such that the release structure 620 is facing the ground and the liquid within the container 110 abuts the release structure 620. Thus, the force applied against the release structure 620 may generally be supplied by the air pressure within the container forcing the liquid against the release structure 620. Once a threshold pressure is reached or built-up within the container 110, the release structure 620 may release a portion of the liquid. The air pressure within the container 110 may then stabilize. As the temperature of the volume of air within the container continues to increase, the pressure in the container 110 may then increase again and the process may be repeated.

As the ambient temperature decreases, such as when night falls, air from outside the container 100 may enter through the release structure 620 into the container 100. That is, the temperature may decrease, causing a negative pressure such that air from outside the container 100 may be sucked into the container 100 through the release structure 620. The pressure inside and outside of the container 100 may then be equalized. In some embodiments, a separate vent, valve, or release structure may be used to stabilize the air pressure within the container 110. As such, the release structure 620 may be used to let liquid and/or air out of the container 110 while the separate vent, valve, or release structure may allow air into the container 110.

Figure 6B:
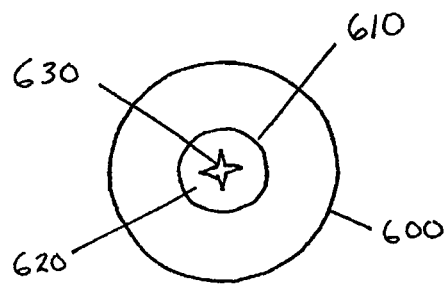
FIG. 6B is a top view of the release structure having a cross slit of FIG. 6A in an open position in accordance with an embodiment of the present disclosure.

The release structure may generally comprise a slit, opening, passage, etc., such that in a normal state, the slit, opening, passage, etc. may be in a closed position and liquid from the dispenser may not be released. The slit, opening, passage, etc. may, at certain times, such as when pressure builds within the container 110, transition to an open position, whereby a portion of the liquid within the container 110 may be released. The slit, opening, passage, etc. may then transition back to the normal state, closed position. In one embodiment, as illustrated in FIG. 6A, the release structure 620 may comprise a cross slit 630, i.e., two slits substantially forming a cross or "X." In a normal state, the cross slit 630 may be in a closed position, such that liquid within the container 110 is not released. As the pressure builds within the container 110, the release structure 620 may begin to expand. Once the release structure 630 has substantially reached a point where it can no longer expand, e.g., a threshold pressure, the cross slit 630 may separate to an open position, as illustrated in FIG. 6B, such that a portion of the liquid may be released from the container 110. This may release the liquid as a burst or discrete portion of the overall liquid. Once the portion of liquid is released and the pressure is stabilized, the cross slit 630 may return to a normal state, closed position.

Figure 7A:
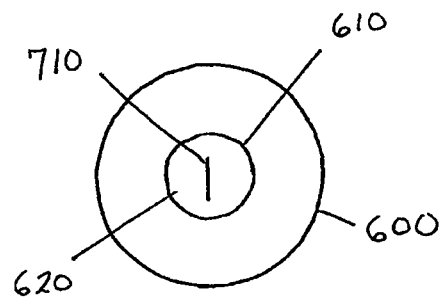
FIG. 7A is a top view of a release structure having a single slit in a normal, closed position in accordance with one embodiment of the present disclosure.
Figure 7B:
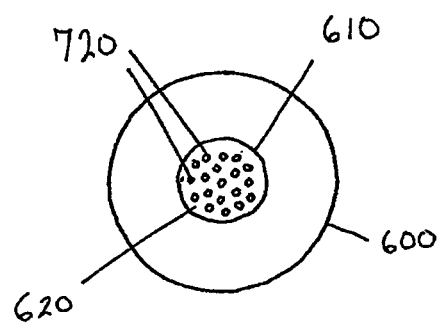
FIG. 7B is a top view of a release structure having perforations in accordance with another embodiment of the present disclosure.
Figure 7C:
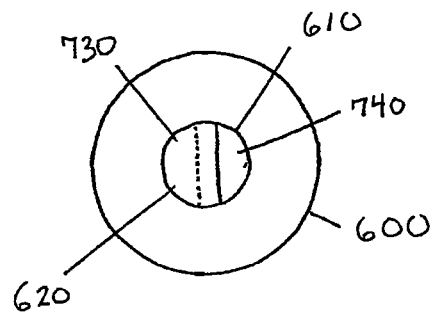
FIG. 7C is a top view of a release structure having overlapping flaps in a normal, closed position in accordance with a further embodiment of the present disclosure.
Figure 7D:
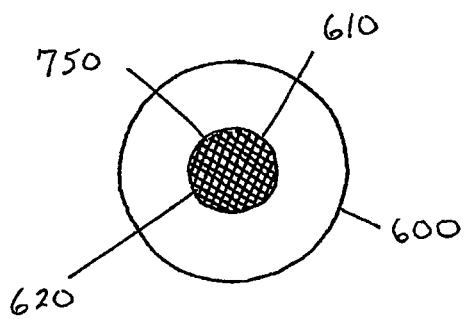
FIG. 7D is a top view of a release structure having a semipermeable membrane in accordance with yet another embodiment of the present disclosure.

As can be seen in FIGS. 7A-7D, the release structure 620 may comprise a variety of means for releasing liquid from within the container 110. For example, as shown in a normal state, closed position in FIG. 7A, the release structure 620 may comprise a single slit 710. In another embodiment, the release structure may comprise a plurality of small holes or perforations 720, such that a threshold amount of pressure may be required for a liquid to pass through the holes or perforations 720. Although FIG. 7B illustrates several holes or perforations 720, it is recognized that a fewer or greater number of holes or perforations may be used in accordance with the present disclosure. In a similar embodiment, a single hole may be used. The single hole or plurality of holes or perforations may be any suitable size, such that a portion of the liquid from within the container 110 may be released upon reaching a threshold amount of air pressure within the container 110. In some embodiments, the surface tension created at the scent release orifice 610 may provide an alternative to using a release structure 620. As can be seen in a normal state, closed position in FIG. 7C, the release structure 620 may comprise two or more overlapping surfaces 730, 740 or membranes. In yet another embodiment, as illustrated in FIG. 7D, the release structure 620 may comprise a semipermeable membrane 750, such that liquid from the container 110 may be forced through the membrane 750. In one embodiment, the release structure 620 may comprise a diaphragm. The diaphragm may include any of the features relating to the release structure previously described. Similarly, other suitable means for releasing a liquid from the container 110 after a threshold pressure has been reached, or otherwise achieving the same effect, may be used, such as but not limited to, bendable plastic or a spring loaded door or opening. In one embodiment, instead of a cap 600, a material or fabric may be provided that may be positioned over an opening of the container 110. The material or fabric may allow a liquid to be dispensed therethrough when a threshold amount of pressure is reached within the container 110. The material or fabric may be retained at an opening of the container 110 using, for example, an expandable band, e.g., rubber band.

The release structure 620 may release a liquid in the form of a burst of liquid, spray of liquid, drop or drops of liquid, etc. The portion, or amount, of liquid released, in one embodiment, may vary with the size of the slit(s), hole(s), perforations, etc. in the release structure 620. Similarly, the portion, or amount, of liquid released may vary with the strength or weakness of the membrane making up the release structure 620. Furthermore, the amount of pressure required to cause the liquid to be released, and thus the amount of temperature increase, may also be determined by the type, strength, and or size of the release structure used as well as the size of the slit(s), hole(s), perforations, etc. in the release structure 620. As previously stated, multiple variants of release structure 620 may be used to create different liquid scent dispensers that vary in amount of the liquid released per burst, spray, drop, etc., the temperature increase between bursts, sprays, drops, etc., and the like. That is, the amount of liquid released per burst, spray, drop, etc. and the frequency of the bursts, sprays, drops, etc. may be determined by the type, strength, and or size of the release structure used as well as the size of the slit(s), hole(s), perforations, etc. in the release structure 620. For example, a weaker release structure may release smaller amounts of liquid more frequently than a stronger release structure that releases a larger amount of liquid. In some embodiments, as the volume of liquid decreases in the container 110, the amount of liquid released for the same amount of temperature swing may increase. That is, as the proportionate amount of air in the container increases, the frequency of dispensing and/or the amount of liquid dispensed may also increase. Therefore, a larger bottle with the same volume of liquid as a smaller bottle may dispense the liquid more quickly. Similarly, the color of the liquid scent dispenser 100 may be altered to increase frequency and/or the amount of liquid released from the container 110. For example, a dark colored container, e.g., a black colored container, may heat up faster and/or to a higher temperature than other containers.

In a further embodiment of the liquid scent dispenser 100, a chamber, either separate from the container 110 or contained within the container 110, may be provided for maintaining the release of a constant volume of scent upon an appropriate amount of air pressure build up. For example, the chamber may be sized such that a predetermined amount of liquid will be released upon reaching a predetermined pressure increase. The size of the chamber may remain constant, and the amount of liquid in the chamber after each liquid scent release may be automatically refilled to a constant initial amount from the supply of liquid scent in the container 110. Alternatively, the container 110 may include a control valve for controlling or setting the amount of scent that will be released each time the container reaches the threshold pressure.

In one embodiment of operation, with reference to the liquid scent dispenser 200, the container 210 of a liquid scent dispenser may be filled with a liquid animal attractant. Although description of one embodiment of operation is detailed with reference to liquid scent dispenser 200, it is noted that any liquid scent dispenser in accordance with the present disclosure may be used, such as liquid scent dispensers 100, 400, etc.

The container 210 may be filled or refilled at the container opening 240. In some embodiments, the container 210 may not typically be filled completely. It can be appreciated that, the ratio between the volume of liquid attractant and the volume of air within the container 210 may affect the amount of liquid attractant released from the container 210, whereby the larger the proportion of the volume of air in the container 210 to the volume of liquid attractant initially, the greater will be the amount of liquid attractant released for a given temperature increase. As such, in some embodiments, the container 210 may be filled to less than half full, to less than a quarter full, to less than one eighth full, or with a predetermined volume of liquid attractant, such as 4 ounces, 2 ounces, or any other suitable volume of liquid attractant. Generally, however, for similar size prior art scent dispensers, the liquid scent dispenser 200 of the present disclosure may contain larger amounts of liquid scent than prior art scent dispensers and maintain proper functionality.

In some embodiments, the liquid attractants may be provided in their own separate packaging for use as a refill for the liquid scent dispenser 200. For example, the liquid attractants may be provided in bottles containing a predetermined volume of liquid attractant, such as 4 ounces, 2 ounces, or any other suitable volume of liquid attractant, including more or less than 4 ounces. In alternative embodiments, the liquid scent dispenser 200 may be disposable, including "one-time-use" disposable, and the liquid attractant may be provided with the liquid scent dispenser 200 and contained within the container 210. After the container 210 is filled with a suitable volume of liquid scent, the cap 230 may be placed over the opening, for example, by threading the cap 230 onto the opening 240.

The liquid scent dispenser 200 may be suspended, by the hanging means 280. The liquid scent dispenser 200 may be hung at any suitable location, such as from a tree branch, near a deer stand, etc. In one embodiment, the liquid scent dispenser 100 may be suspended above a natural scrape, for example, a scrape prepared by a white-tail buck, as previously described. In other embodiments, the liquid scent dispenser 100 may be suspended above an artificial scrape, such as a man-made scrape. The liquid scent dispenser 200 may be hung such that the container 210 is above the scent release orifice 610 in relation to the ground or scrape.

In operation, an increase in ambient temperature may cause an increase in pressure, or a build-up of pressure, of the volume of air within the container 110 resulting in the liquid attractant being pushed into the scent release orifice 610 and through the release structure 620, after which it can burst, spray, drip, etc. onto the ground or scrape or other suitable surface. As the liquid attractant is released, pressure from the volume of air within the container 110 may decrease. As such, the liquid scent dispenser 100 may be returned or reset to an initial, or normal, state.

Thus, the embodiments of the present disclosure can provide for unattended scent release, and in particular, may provide for unattended scent release under average conditions as experienced by hunters in the northern United States, during a period of from 1-10 days, 5-9 days, or any other suitable period of time. In a further embodiment, an animal, e.g., deer, may be trained to come around during a predetermined time, such as the daytime, of each day, by placing and leaving a liquid scent dispenser 100 in a specified spot for a period of time.

In one embodiment, for operation in the manner so described, small cycles in temperature change that can occur throughout the day may not trigger scent release from the liquid scent dispenser 100. This situation may be desirable, as such frequent deposition can be unnecessary and wasteful. Additionally, if the temperature during the day does not increase more than 10 degrees Fahrenheit, for example, oftentimes the minor increase may indicate inclement weather, and specifically, the occurrence of rain, during which scent deposition may not be particularly effective.

Although the present invention has been described with reference to preferred embodiments, persons skilled in the art will recognize that changes may be made in form and detail without departing from the spirit and scope of the invention. For example, a wide variety of modifications to the embodiments of the present disclosure may be made with respect to, for example, container shapes and dimensions, and with respect to the orientation thereof to the ground.

I claim:

1. A method of dispensing a liquid scent using a temperature regulated, pressure activated scent dispenser having a container defining an interior volume and a container opening, the dispenser further having a cap and a scent release orifice including a release structure, the method comprising:
    filling the container interior volume partially with a volume of the liquid scent so that the container interior volume also includes a volume of air;
    securing the cap to the container opening;
    suspending the scent dispenser over a ground surface of a desired animal attracting location, wherein the scent release orifice is below the container interior volume with respect to the ground surface, and further wherein the volume of air is held within the container above the volume of liquid scent; and
    dispensing the liquid scent from the interior volume through the scent release orifice without using manual regulation to commence or control release or flow of the liquid scent, wherein the release structure is a diaphragm comprising at least one slit, the diaphragm configured to permit a build-up of air pressure in the interior volume when there is an increase in ambient temperature above an initial ambient temperature, and further wherein, upon reaching a threshold amount of built-up air pressure, the at least one slit of the release structure is forced to an open position to release a portion of the liquid scent from the interior volume as a burst and subsequent stream of liquid, thereby decreasing the amount of built-up air pressure in the interior volume such that the pressure stabilizes and the at least one slit returns to a closed position.

2. The method of claim 1, wherein the container further comprises means for suspending the container over the ground surface of a desired animal attracting location.

3. The method of claim 2, wherein the cap comprises the scent release orifice.

4. The method of claim 3, wherein the container is made of plastic.

5. The method of claim 3, wherein the liquid scent is an animal repellent.

6. The method of claim 3, wherein the animal is a deer and the liquid scent is a deer attractant.

7. The method of claim 6, wherein the deer attractant comprises one or more scents that may precipitate a territorial or mating attraction on deer before, during, or after rut.

8. The method of claim 7, wherein the release structure comprises at least one structure for allowing the release of the liquid selected from the group consisting of a slit, two slits in the shape of an 'X,' at least one perforation, overlapping membrane flaps, and a semipermeable membrane.

9. The method of claim 8, wherein the structure comprises two slits and the size of the portion of the liquid scent released by the release structure is based on the size of the two slits.

10. The method of claim 8, wherein the size of the portion of the liquid scent released by the release structure is based on the strength of the release structure.

11. The method of claim 8, wherein the liquid scent dispenser is disposable.

12. The method of claim 8, wherein the liquid scent dispenser is refillable.

13. The method of claim 6, wherein suspending the scent dispenser over a ground surface of a desired animal attracting location, further comprises suspending the scent dispenser over a scrape.

14. A method of dispensing a liquid scent using a container including an interior volume having a volume of liquid scent and a volume of air, the dispenser having a scent release orifice including a release structure, the method comprising:
   suspending the scent dispenser over a ground surface of a desired animal attracting or repelling location, wherein the scent release orifice is below the container interior volume with respect to the ground surface, and further wherein the volume of air is held within the container above the volume of liquid scent; and
   dispensing the liquid scent from the interior volume through the scent release orifice without using manual regulation to commence or control release or flow of the liquid scent, wherein the release structure comprising at least one slit is configured to permit a build-up of air pressure in the interior volume when there is an increase in ambient temperature above an initial ambient temperature, and further wherein, upon reaching a threshold amount of built-up air pressure, the liquid scent forces the at least one slit to separate to an open position so as to release a portion of the liquid scent from the interior volume as a burst and subsequent stream of liquid;
   wherein upon release of the portion of liquid scent, the amount of built-up air pressure within the interior volume is decreased and the at least one slit transitions to a closed position.

15. The method of claim 14, wherein the size of the portion of the liquid scent released by the release structure is based on the size of at least one passage in the release structure when in the open position.

16. The method of claim 14, wherein the size of the portion of the liquid scent released by the release structure is based on the strength of the release structure.

17. A method of dispensing a liquid scent using a temperature regulated, pressure activated scent dispenser having a container defining an interior volume and a container opening, the dispenser further having a cap and a scent release orifice including a diaphragm, the method comprising:
   filling the container interior volume partially with a volume of the liquid scent so that the container interior volume also includes a volume of air;
   securing the cap to the container opening;
   suspending the scent dispenser over a ground surface of a desired animal attracting location, wherein the scent release orifice is below the container interior volume with respect to the ground surface, and further wherein the volume of air is held within the container above the volume of liquid scent; and
   dispensing the liquid scent from the interior volume through the scent release orifice without using manual regulation to commence or control release or flow of the liquid scent, wherein an increase in ambient temperature above an initial ambient temperature results in a build-up of air pressure in the interior volume, and further wherein, upon reaching a threshold amount of built-up air pressure, the diaphragm comprising at least one slit is forced to an open position in order to release a portion of the liquid scent as a burst and subsequent stream of liquid from the interior volume, thereby decreasing the air pressure in the interior volume such that the pressure stabilizes and the at least one slit transitions back to a closed position.

* * * * *